United States Patent
Pisters et al.

(10) Patent No.: US 11,061,725 B2
(45) Date of Patent: Jul. 13, 2021

(54) MANAGING A SET OF COMPUTING RESOURCES

(71) Applicant: INTERNATIONAL BUSINESS MACHINES CORPORATION, Armonk, NY (US)

(72) Inventors: Ramon Leonard Hendrik Pisters, Weert (NL); Pascal Jacobus Christiaan van Ool, Echt (NL); Ivo Claessens, Munstergeleen (NL)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 15/937,048

(22) Filed: Mar. 27, 2018

(65) Prior Publication Data
US 2019/0303202 A1    Oct. 3, 2019

(51) Int. Cl.
*G06F 11/30*      (2006.01)
*G06F 9/50*       (2006.01)
(Continued)

(52) U.S. Cl.
CPC ........ *G06F 9/5011* (2013.01); *G06F 11/0751* (2013.01); *G06F 11/1458* (2013.01);
(Continued)

(58) Field of Classification Search
CPC ............ G06F 11/0751; G06F 11/0766; G06F 11/0793; G06F 11/3089; G06F 11/3096; G06F 11/1458; G06F 9/5011
See application file for complete search history.

(56) References Cited

U.S. PATENT DOCUMENTS 5,586,250 A  *  12/1996  Carbonneau  .......... G06F 3/0607
                                                  714/44
7,783,666 B1     8/2010  Zhuge et al.
(Continued)

FOREIGN PATENT DOCUMENTS

EP         1244016 A1      9/2002

OTHER PUBLICATIONS

Mell et al., "The NIST Definition of Cloud Computing", Recommendations of the National Institute of Standards and Technology, NIST Special Publication 800-145, Sep. 2011, 7 pages.

*Primary Examiner* — Yolanda L Wilson
(74) *Attorney, Agent, or Firm* — Anthony M. Pallone

(57) ABSTRACT

An embodiment of the invention may include a method, computer program product and system for managing a set of computing resources. The embodiment may include accessing a set of rules for the set of computing resources. Each rule including one or more conditions relating to use of a computing resource and one or more actions. The embodiment may include capturing information relating to the use of the computing resources. The information includes a usage pattern of the computing resource, the usage pattern is maintained by the system prior to and post deletion of the computing resource. The embodiment may include applying each rule of the set of rules that include a condition relating to use of a specific computing resource, when the specific computing resource is used. The embodiment may include performing each action included in a specific rule when the conditions for the specific rule are met.

18 Claims, 9 Drawing Sheets

(51) Int. Cl.
*G06F 11/14* (2006.01)
*G06F 11/07* (2006.01)

(52) U.S. Cl.
CPC ...... *G06F 11/3003* (2013.01); *G06F 11/3089* (2013.01); *G06F 2201/84* (2013.01)

(56) References Cited

U.S. PATENT DOCUMENTS

| | | |
|---|---|---|
| 9,256,841 B2 | 2/2016 | DiFalco et al. |
| 9,275,065 B1 | 3/2016 | Ganesh et al. |
| 2009/0037656 A1* | 2/2009 | Suetsugu ............ G06F 11/1092 711/114 |
| 2009/0144545 A1 | 6/2009 | Dhuvur et al. |
| 2010/0083057 A1 | 4/2010 | Laxminarayanan |
| 2010/0182887 A1* | 7/2010 | Moody, II ............ G06F 11/0727 369/53.42 |
| 2012/0066449 A1* | 3/2012 | Colgrove ................ G06F 3/061 711/114 |
| 2015/0082197 A1* | 3/2015 | Pearl ....................... G06Q 10/10 715/753 |
| 2015/0120747 A1* | 4/2015 | Jangra ................... H04L 41/085 707/741 |
| 2015/0365291 A1* | 12/2015 | Burton ................ H04L 41/0893 709/226 |
| 2016/0171195 A1* | 6/2016 | Moloian ............. G06F 21/6218 726/19 |
| 2017/0193201 A1 | 7/2017 | Eccleston et al. |

\* cited by examiner

MANAGING A SET OF COMPUTING RESOURCES

BACKGROUND

The present invention relates to a method of managing a set of computing resources and to a system and computer program product for performing the method.

In computing, a system resource is any physical or virtual component of limited availability within a computer system. Every device connected to a computer system is a resource. Every internal system component is a resource. Virtual system resources include files, network connections, and memory areas. Managing resources is referred to as resource management and includes both preventing resource leaks (e.g. releasing a resource when a process has finished using it) and dealing with resource contention (e.g. multiple processes attempting to access a limited resource).

BRIEF SUMMARY

According to a first aspect of the present invention, there is provided a computer implemented method of managing a set of computing resources, the method including accessing a set of rules for the computing resources, each rule including one or more conditions relating to use of a computing resource and one or more actions, capturing information relating to the use of the computing resources, the information relating to use of the computing resource includes a usage pattern of the computing resource within a system, the usage pattern of the computing resource is maintained by the system prior to and post deletion of the computing resource, applying each rule of the set of rules that include a condition relating to use of the computing resource, when the computing resource is used, and performing each action included in a specific rule of the set of rules that include a condition relating to use of the computing resource when the condition relating to use of the computing resource is met.

According to a second aspect of the present invention, there is provided a system for managing a set of computing resources, the system including a processor arranged to access a set of rules for the computing resources, each rule including one or more conditions relating to use of a computing resource and one or more actions, capture information relating to use of the computing resource, wherein the information relating to use of the computing resource comprises a usage pattern of the computing resource within a system, and wherein the usage pattern of the computing resource is maintained by the system prior to and post deletion of the computing resource, apply each rule of the set of rules that include a condition relating to use of the computing resource, when the specific computing resource is used, and perform each action included in a specific rule of the set of rules that include a condition relating to use of the computing resource when the condition relating to use of the computing resource is met.

According to a third aspect of the present invention, there is provided a computer program product for controlling a data processing system including a processor, the computer program product comprising a computer readable storage medium having program instructions embodied therewith, the program instructions executable by the processor to cause the processor to access a set of rules for the computing resources, each rule including one or more conditions relating to use of a computing resource and one or more actions, capture information relating to use of the computing resource, wherein the information relating to use of the computing resource comprises a usage pattern of the computing resource within a system, and wherein the usage pattern of the computing resource is maintained by the system prior to and post deletion of the computing resource, apply each rule of the set of rules that include a condition relating to use of the computing resource, when the specific computing resource is used, and perform each action included in a specific rule of the set of rules that include a condition relating to use of the computing resource when the condition relating to use of the computing resource is met.

BRIEF DESCRIPTION OF THE DRAWINGS

Preferred embodiments of the present invention will now be described, by way of example only, with reference to the following drawings, in which.

DETAILED DESCRIPTION

Figure 1:
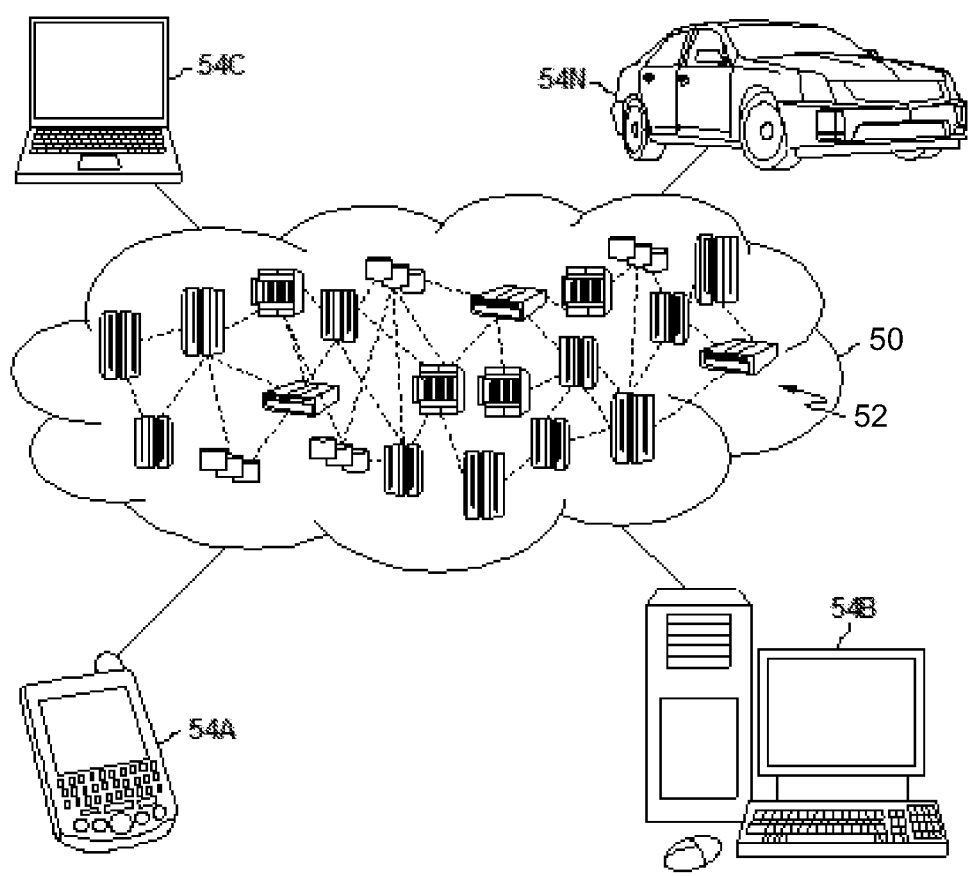
FIG. 1 is a schematic diagram of a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 52 and cloud computing environment 50 can communicate with any type of computerized device over any type of network and/or network addressable connection (e.g., using a web browser).

Figure 2:
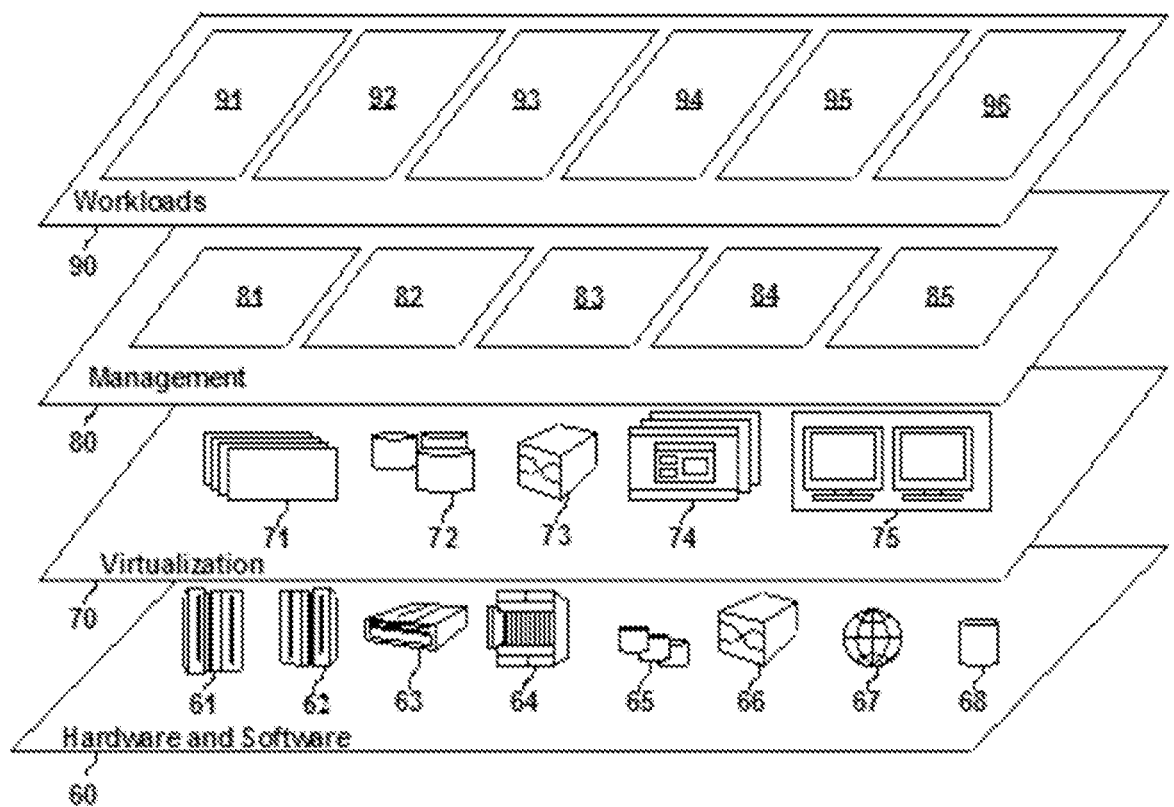
FIG. 2 is a schematic diagram of abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfilment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and usage monitoring 96.

As an increasing amount of software is moving to the cloud, the cloud systems themselves are becoming increasingly complex. Consequently, managing live systems in the cloud has become quite a challenge. Embodiments of the invention describe a resource management system for use in managing a live cloud system.

Many cloud systems have resources or documents that users can create, store and use in those systems. For example, in Watson Analytics™ users can create a visualization that in turn can be used in a team dashboard, both are stored as a document (i.e. a resource) in the system and both types of documents can be shared with other users (e.g. shared amongst the team). In practice this means that some documents may have a dependency on other documents; for the dashboard document to properly work all the referenced visualization documents need to be present and accessible. It also means that reference to high-level (i.e. highly accessed) documents like the dashboard itself also need to be present and accessible in order for other users work to be able to open the team's dashboard. While in Watson Analytics™ we see these requirements and dependencies with resources such as documents, these requirements and dependencies are also present in other systems that contain resources such as documents, links to webpages, images, etc.

The requirement that resources in a cloud system need to be present and accessible in order for the system to work well, means that any disruption to the accessibility of a requested resource may result in system errors. For example, a user deleting, renaming, or "un-sharing" a resource can create a situation in which other users are no longer able to use the resource. The same situation may also arise when a DevOps or other system admin performs maintenance work on the system, such as performing an upgrade or a clean-up task.

As seen in Watson Analytics™, as well as in other systems, a common response to a missing resource results in a logging of error messages generated when users fail to access a requested resource. This means log monitoring needs to be in place and then the frequency of log errors needs to be used to generate some sort of alert. However, this action is typically "after the fact" and difficult to monitor and be useful in practice. Another common response to a missing resource is the users of the system complaining via various channels that the system is not working.

Therefore, it would be advantageous to capture unintended harmful changes to resources as early as possible, preferably at the moment it happens. To this effect, embodiments of the present invention attempt to capture the usage patterns of the resources within a system. Thereafter, a set of defined rules to detect harmful or high-risk change, either immediately or at a desirable moment soon thereafter, may be applied to the captured usage patterns. In practice this may enable embodiments of the invention to detect, for example, the deletion of a document that is currently in high volume usage. Deleting such a document would very likely cause other users to "fail" fetching and using the document from the system, thus triggering complaints. In embodiments of the invention, the deletion may be detected, and, for example, a system administrator may be immediately notified that such a document has been deleted.

Figure 3:
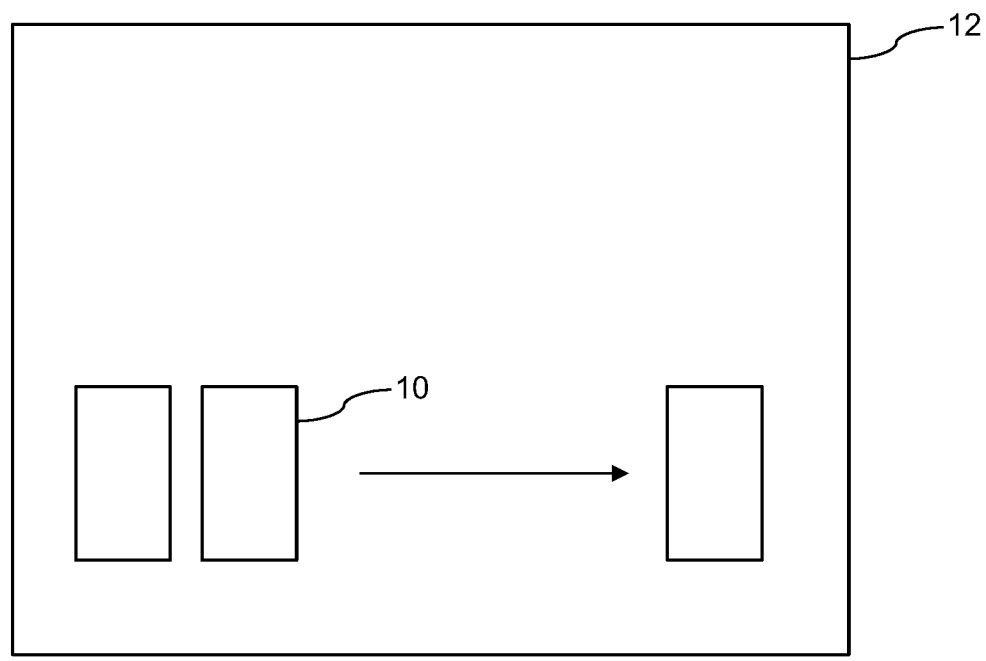
FIG. 3 is a schematic diagram of a system using computing resources, in accordance with an embodiment of the invention.

FIG. 3 shows a schematic diagram of a set of computing resources 10. The computing resources 10 form part of a live cloud software production (LCSP) system 12 used in a software product. The computing resources 10 within the LCSP system 12 are distributed over different hardware components stored at different locations but are accessible by any user that connects to the LCSP system 12. The production LCSP system 12 does not only have the software itself to manage, but also the underlying systems that support the software product. One of these supporting systems can be systems such as filesystems or other resource management systems that store information, objects, or other computing resources 10 available to one or more software applications. LCSP system 12 may be described generally with respect to FIG. 9 below.

For example, in a cloud-based work environment, the users of the LCSP system 12 can create documents (which are also computing resources 10) that are stored and potentially shared between users. This means that making sure a cloud product runs well, not only means the software itself needs to be running, but also the supporting computing resources 10 "underneath" need to be in the correct state. In some cases, end users themselves can alter these computing resources 10, in other cases a system administrator, or cloud-software operators, can also influence or manage these computing resources 10, either directly or indirectly. End users can update and amend computing resources 10 and can also add and delete computing resources 10.

In a complex LCSP system 12, the computing resources 10 and access to them has become increasingly difficult to manage, and within cloud systems it is common for a user or a cloud-software operator to accidentally delete a key computing resources 10 and subsequently bring the LCSP system 12 to an error state. Not only does the absence of an inadvertently deleted key computing resources 10 prevent the functional use of the LCSP system 12, but this may also cause other fallout to the LCSP system 12, such as a strain on the resource system for the continued querying (retries) of missing computing resources 10. The LCSP system 12 is configured to address the issue of resource problems by making a resource management system more aware by monitoring how computing resources 10 are accessed and potentially changed and allowing the LCSP system 12 to respond with pre-defined actions and rules.

Figure 4:
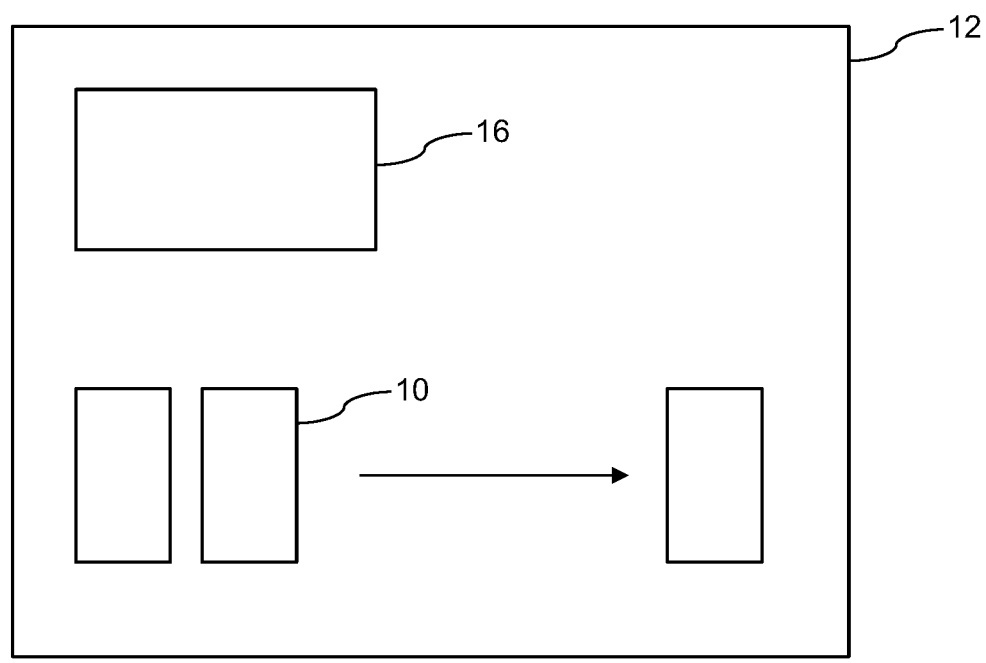
FIG. 4 is a schematic diagram of a system similar to that shown in FIG. 3, in accordance with an embodiment of the present invention.
Figure 4:

FIG. 4 shows an example scenario of a LCSP system 12 where users 14 can work on computing resources 10 and share them with other users 14. A resource management system is used to make the LCSP system 12 more resilient to unintended changes and help the users 14 and operators to manage the LCSP system 12. As computing resources 10 are shared, other users 14 can connect to these computing resources 10 and use them, for example in an aggregated overview such as a dashboard. This means that users 14 depend on the availability of computing resources 10 in the LCSP system 12. A resource management resource management system 16 is provided, which is responsible for managing the computing resources 10.

Typically, many users 14 and computing resources 10 are currently part of the LCSP system 12, and all of the different components within the LCSP system 12 are all working well. A user 14 of some kind (such as a regular user or cloud operator) may decide to perform some sort of clean-up, for example by removing or un-sharing computing resources 10 that are no longer needed. Any mistake in this process may have a negative effect. If such an event (i.e. removing, un-sharing) happens unintentionally to a computing resources 10 that is used by other users 14, the result may be an increased amount of error messages and user complaints. An incorrectly deleted computing resources 10 will have widespread negative effects within the LCSP system 12 and to the users 14.

The resource management resource management system 16 is configured to make the LCSP system 12 resilient to this type of situation through early detection that such a condition has occurred. The resource management resource management system 16 will do this by monitoring the "usage patterns" of such computing resources 10 (or indeed any computing resources 10). This monitoring of usage patterns happens continuously, and so is an integral part of the overall LCSP system 12. In general terms, the resource management resource management system 16 monitors the usage of the components 10 by the end users 14 and will detect any situation where it is highly likely that some kind of error has occurred, such as the deletion of a computing resources 10 that is still required by the users 14 of the LCSP system 12.

After a user 14 removes the computing resources 10 or un-shares the computing resources 10, meaning that the user 14 removes permissions for others to access the computing resources 10, the LCSP system 12 may typically return an error that the computing resources 10 is no longer available. The error on its own is not unusual, so nothing is triggered, while the users 14 will actually experience the real-life implication of not being able to access the requested computing resources 10. If such errors are logged and log monitoring is in place, then at best if the error happens often, an administrator or cloud operator would get notified. A response like this would have to be set up outside of the LCSP system 12 and based on logs and log monitoring.

Rather than just returning an error, as in a system without resource management resource management system 16, resource management resource management system 16 will use stored usage patterns, along with a set of definable rules, to determine the best course of action in response. Depending on the situation, rules may be setup differently, thereby allowing for different responding actions by the LCSP system 12. For example, the resource management resource management system 16 could be configured so that an operator gets paged, with a rule that would look like the following:

"*IF* prior_usage==HIGH and
current_failure_rate==HIGH THEN PAGE
"Operator" (1)

Rules can take one or more stored usage patterns into account, which include statistics on how frequently computing resources 10 are used, how frequently computing resources 10 are now "not found" leading to failure, how many users 14 have access or had access to computing resources 10, etc. The resulting actions could include various possibilities such as paging someone, sending out an email, restoring a computing resources 10, or possibly even refusing the current change to the computing resources 10.

Embodiments of the invention are specifically different from error or event monitoring solutions in that error or event monitoring only allows for reaction to certain specific errors or events, and is therefore always "after the fact", after the harm has already been done. In addition, the unintended disruptive change to a resource, may technically not be an error or event, which may make it difficult or even impossible to log. Furthermore, once logged it will also be difficult to monitor and define alerts in a desired way. Moreover, an error or event monitoring solution will lack the usage patterns of the resources to make a specific decision (described in rules) to react to a disruptive change or detect it later on (if so desirable).

Figure 5:
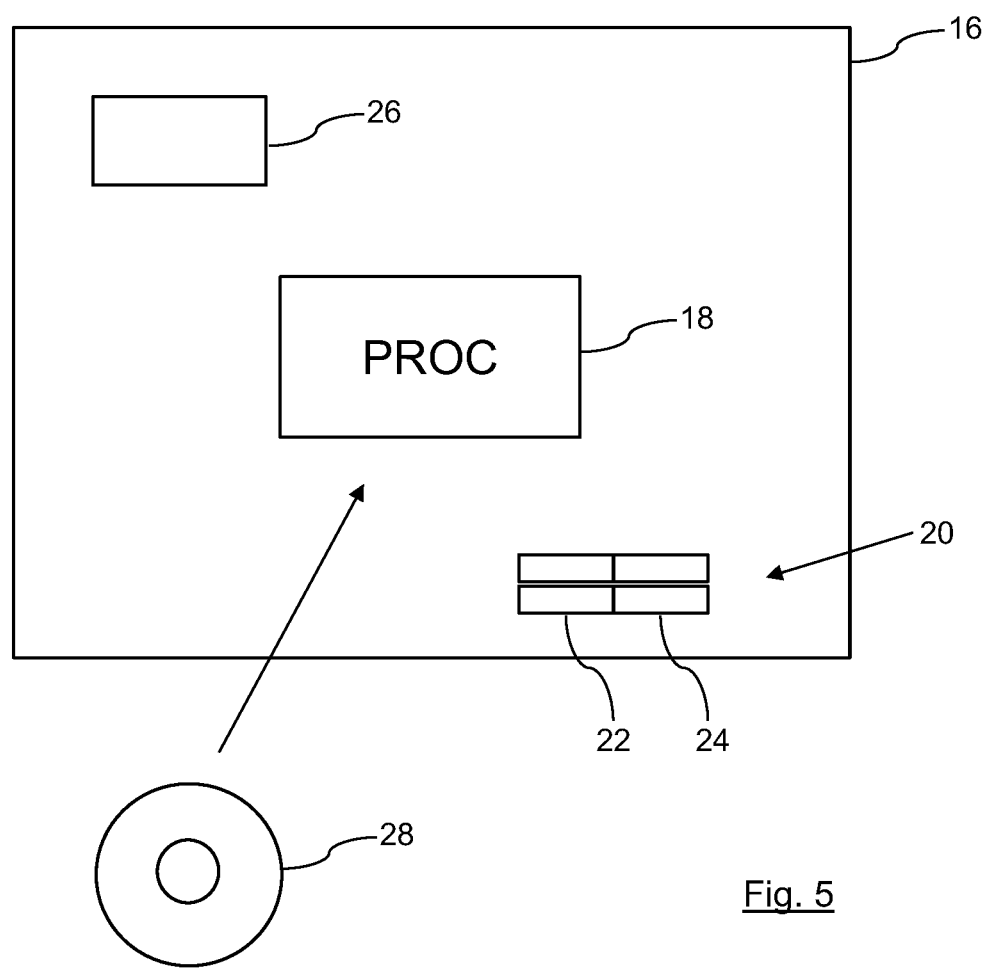
FIG. 5 is a schematic diagram of a resource management system, in accordance with an embodiment of the present invention.

FIG. 5 shows a schematic diagram of the resource management resource management system 16, which includes a processor 18 and stored rules 20. Each rule 20 has one or more conditions 22 and one or more actions 24. The resource management resource management system 16 also stores usage patterns 26, which includes information relating to the use of the computing computing resources 10. The resource management resource management system 16 is a data processing system that is operated by the processor 18. A computer readable storage medium 28 is provided which is a CD-ROM which includes a computer program product for controlling the data processing system including the processor 18. The computer program product is a computer readable storage medium having program instructions embodied therewith, the program instructions executable by the processor 18 to cause the processor 18 to perform the necessary operations.

Figure 6:
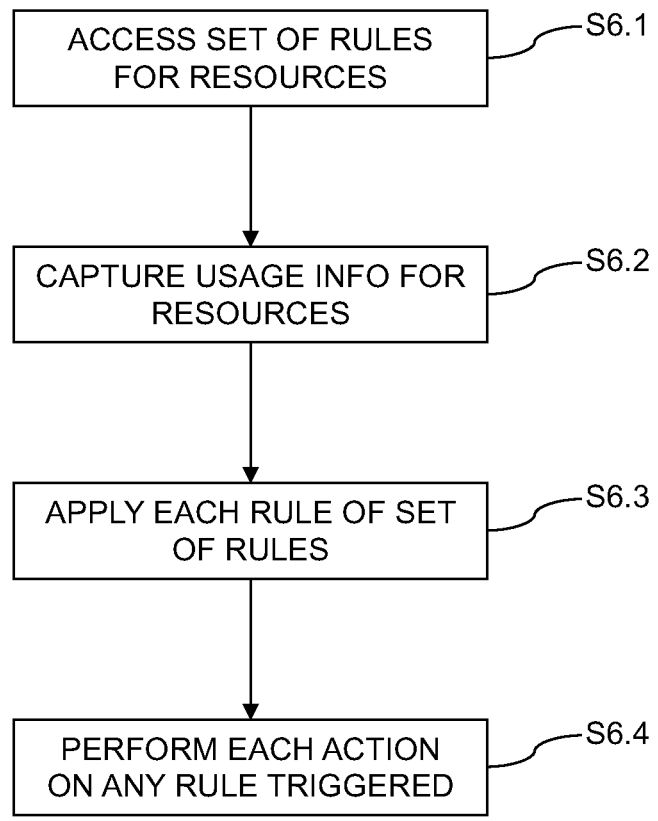
FIG. 6 is a flowchart of a method of operating the resource management system, in accordance with an embodiment of the present invention.

The resource management resource management system 16 is a resource management system, which could be a file system such as NTFS (New Technology File System), or a document management system or repository. Resource management resource management system 16 may be a program, or subroutine contained in a program, that may operate to manage the computing resources of LCSP system 12. A smart resource service is also present, which is a service that either sits on top of the resource management resource management system 16, or is directly integrated with the resource management resource management system 16, that tracks the usage patterns 26 and holds and applies the rules 20. The steps of the operation of the resource management resource management system 16 are shown in FIG. 6. Step S6.1 includes accessing a set of rules for the computing computing resources 10. Before the resource management resource management system 16 enters into operation, a cloud operator or administrator has the opportunity to add rules 20 to the smart resource service. These rules 20 are intended to "monitor" the LCSP system 12 and requests made to this LCSP system 12, so that any unintended change can be detected by the resource management resource management system 16 immediately or very quickly.

The smart resource service achieves this prompt detection by constantly applying the rules 20 against the current information it has, which includes usage patterns 26 for all computing resources 10, which is described in more detail below. Each rule 20 contains a condition 22 and an action 24. The condition 22 uses a number of input variables from the running LCSP system 12, including the details in the usage patterns 26, to determine whether the associated action 24 needs to be triggered. One or more rules 20 of the set of rules includes a condition 22 relating to a current error rate of a computing computing resources 10 referenced in the condition 22, where the error rate relates to the use of the computing computing resources 10. Below is an example of such a rule 20:

"*IF* prior_usage==HIGH and
current_failure_rate==HIGH THEN PAGE
"Operator" (2)

From this it can be seen that the rules 20 in principle can be based on simple if-then-else statements containing a condition 22 as well as action statement(s) 24. The precise syntax of such rules 20 and the complexity of the language with which these rules 20 can be defined is open to the creators of the rules 20. All definable rules 20 are possible and at least have the possibility to define conditions 22 and actions 24. The conditions 22 in these rules 20 can use input variables. The rules 20 can be applied within the context of a request to the LCSP system 12, which means the relevant computing resources 10 is known when applying the rules 20.

The input variables can access information in the LCSP system 12 and this information may include (but is not limited to): (1) the current computing resources 10, (2) the current nature of the request for the computing resources 10, including request telemetry such as time to execute, errors, exceptions or memory usage, (3) usage pattern data of the current computing resources 10, (4) a parent computing resources 10 or other computing resources 10 associated with the current computing resources 10, and their additional information such as usage patterns, (5) runtime information about the LCSP system 12 such as workload, total number of request per hour or failures for example, and (6) other environmental information deemed relevant to any of the conditions 22 or rules 20 such as current time or maintenance windows for example. Rules 20 may be changed during the operation of the resource management resource management system 16. In such case the new rules 20 will get applied from that moment onwards and this would allow for fine tuning or managing the LCSP system 12 during operation.

Step S6.2 of the method comprises capturing the usage patterns 26, which captures information relating to the use of the computing computing resources 10. While the resource management resource management system 16 is running, the smart resource service will track several details concerning the usage of the computing resources 10 within the LCSP system 12. These details are stored with the computing resources 10 or in a separate database. Preferably all captured information relating to the use of a computing computing resources 10 is stored with the specific computing resource. The details are stored in such a way that usage patterns 26 can be linked to the computing resources 10 at any time, this includes situations where computing resources 10 have already been deleted, in which case the usage pattern 26 still is maintained. Each usage pattern 26 can hold many details deemed relevant and can be items already known to the resource management resource management system 16 itself. These details can include, but are not limited to any of the following (1) access frequency, possibly within a certain time span such as the last 90 days for example, (2) the total number of access requests, (3) the total number of users, (4) file size, (5) backup frequency, if known to the system, (6) the total number of changes to the resource, for example content, permissions and/or properties, and (7) other properties that indicate importance.

In practice any usage pattern 26 can hold simple details, but each usage pattern 26 can also contain more complex data. This may include data such as (1) tracking peak usage on certain times of the day or week, (2) tracking details on users that have access and (3) details on which user performs which type of operation on the computing resources 10. The actual details stored in the usage pattern 26 are not essential to the operation of the resource management resource management system 16. Depending on the implementation the details may vary and may be simple or more complex. In addition, usage patterns 26 may use information or data that is already available in the resource management resource management system 16 or use sources for these details that are already in existence. It should be noted that although capturing usage patterns is shown as a single step, this is actually an on-going process that keeps running while resource management resource management system 16 is active.

Step S6.3 comprises applying the rules 20. Rules 20 are typically applied at the moment that a request for any of the computing resources 10 is made. This can be the operation that has an inadvertent effect already or any of the subsequent actions, as the predefined rules 20 in the resource management resource management system 16 are simply applied (or could be applied) upon a request or operation on the computing resources 10 within the LCSP system 12. It is also possible that the rules 20 can be applied based on other triggers not directly related to user requests or operations. Examples of such alternative triggers are timers or events or reaching certain disk quotas.

Once the rules 20 are triggered the resource management resource management system 16 will apply all the predefined rules 20 on the relevant computing resources 10. In case of a request or operation on a specific computing resources 10, this may mean that the rules 20 are applied to only that computing resources 10 (or computing resources 10). In case of other triggers, it is possible that rules 20 apply to all computing resources 10 or only to those computing resources 10 specifically targeted by the rules 20. When the rules 20 are applied, the condition(s) 22 in the rules 20 is/are evaluated. If the condition(s) 22 is/are found to be true, the associated action(s) 24 is/are performed, which is the final step in the method and is explained in detail below.

The resource management resource management system 16 is configured so that the rules 20 are applied often and therefore any embodiment or implementation will need to make sure that rules 20 can be applied efficiently and quickly. For example, by ensuring that the rules 20 are only applied to the relevant resource(s) 10 pertaining to a user's request or operation that triggered the application of the rules 20 is key. It is also possible that rules 20 are defined so they apply to specific computing resources 10 only, which means that they can be easily optimized to be applied against those computing resources 10 only. When rules 20 are applied and an action 24 is triggered it means that the resource management resource management system 16 has completed its goal, which is to detect a situation in the LCSP system 12 based on access patterns, which required an action 24.

Based on the above, the resource management resource management system 16 may operate in three different scenarios: directly, indirectly and delayed. In the first of these a request or operation on a computing resources 10 changes the situation of the computing resources 10. The user action also immediately triggers the application of one or more rules 20, which could immediately trigger one or more actions 24. An example of such a direct action would be: deleting a frequently used file which would immediately result in a warning or notification.

In the second scenario, a request or operation on a computing resources 10 causes a change, however applying the rules 20 does not result in any action immediately. Subsequent requests or operations on the computing resources 10 (such as a read operation) also trigger the rules 20 and may now trigger an action 24. This would happen, for example, if one user deletes a frequently used computing resources 10 and the rules 20 are triggered if too many other users now still try to access this computing resources 10.

In the third scenario, requests or operations on computing resources 10 are taking place but do not (necessarily) trigger any actions 24. However, a timer could lead to the application of the rules 20 and the triggering of actions 24. Here for examples rules 20 could be applied overnight that try to detect frequent (failed) access to a deleted computing resources 10 (or computing resources 10 without access permissions for those users) and lead to a report of "files that should be verified by a system administrator".

Step S6.4 includes performing each action 24 when a rule 20 is applied in response to the completion of the conditions 22 of the rule 20. When the prerequisite for a rule 20 or a number of rules 20 is met, this will trigger an action 24 such as a notification or a process or operation predefined in the rules 20. The main idea for this step is that the pre-defined rules 20 would notify a stakeholder or try to implement corrective action automatically (or both). For example, if it is determined that a computing computing resources 10, referred to in a rule 20 including a condition 22 relating to a current error rate of the specific computing computing resources 10, has been deleted then the performing of each action 24 included in the specific rule 20 when the conditions 22 for the specific rule 20 are met includes restoring the specific computing computing resources 10.

Rules 20 have to be previously set up, for this step to take place and be effective. It is however possible to adjust the rules 20 if the resulting actions 24 are not deemed effective. This could change the actions 24 that the resource management resource management system 16 takes and fine-tune how or when they are triggered. As described above, the resource management resource management system 16 achieves success and effect when a rules 20 triggers an action 24. This means the LCSP system 12 has now helped the administrator or operator to detect a (potentially) harmful situation.

A few examples of actions 24 that can be triggered in different situations will explain how the actions 24 are useful to the administrator or operator. For example, if after deletion of a computing resources 10 there is high traffic related to the deleted computing resources 10, then the action 24 may be to send a warning. If a user or administrator deletes a computing resources 10 that after deletion produces a high traffic pattern, the resource management resource management system 16 will send out a message notification to the people defined in the rules 20 using the chosen communication method. This is an example where the resource management system 16 is used to actively warn about potential problems.

In a second example, if before a deletion of a computing resources 10 there is low traffic, and after deletion there is no traffic then the action 24 may be to stop access pattern recording. If a user or administrator deletes a computing resources 10, that has a low traffic pattern pre-deletion, and has no traffic after the deletion in a predefined time period, the resource management system 16 stops the recording of the access pattern 26 and deletes the recorded access pattern 26 for this computing resources 10. This is an example of fine-tuning the resource management system 16 and making it more effective.

In a third example, if a property changes on a high traffic computing resources 10, then the action 24 may be to build a notification list. If a user or administrator changes a resource attribute, such as read only, on a computing resources 10 with a high traffic pattern, the resource management resource management system 16 can start a process that puts this computing resources 10 on a list for further inspection. This is an example where the system is used to review potential problems. In a fourth example, the resource management resource management system 16 can perform scheduled access pattern comparison, comparing a current day with previous days for critical resources and if necessary send notifications. By setting up one or more rules 20 to compare patterns from different moments in time; if the difference in traffic is more than X % the resource management resource management system 16 will send out a message notification to a list of people defined in the rules 20 using the chosen communication method. Comparison is also possible against usage pattern templates defined in the rule 20 itself, in order to match resource usage against expectations. These are example where the resource management resource management system 16 is used to verify assumed usage patterns and expectations, which may require or warrant further action.

Figure 7:
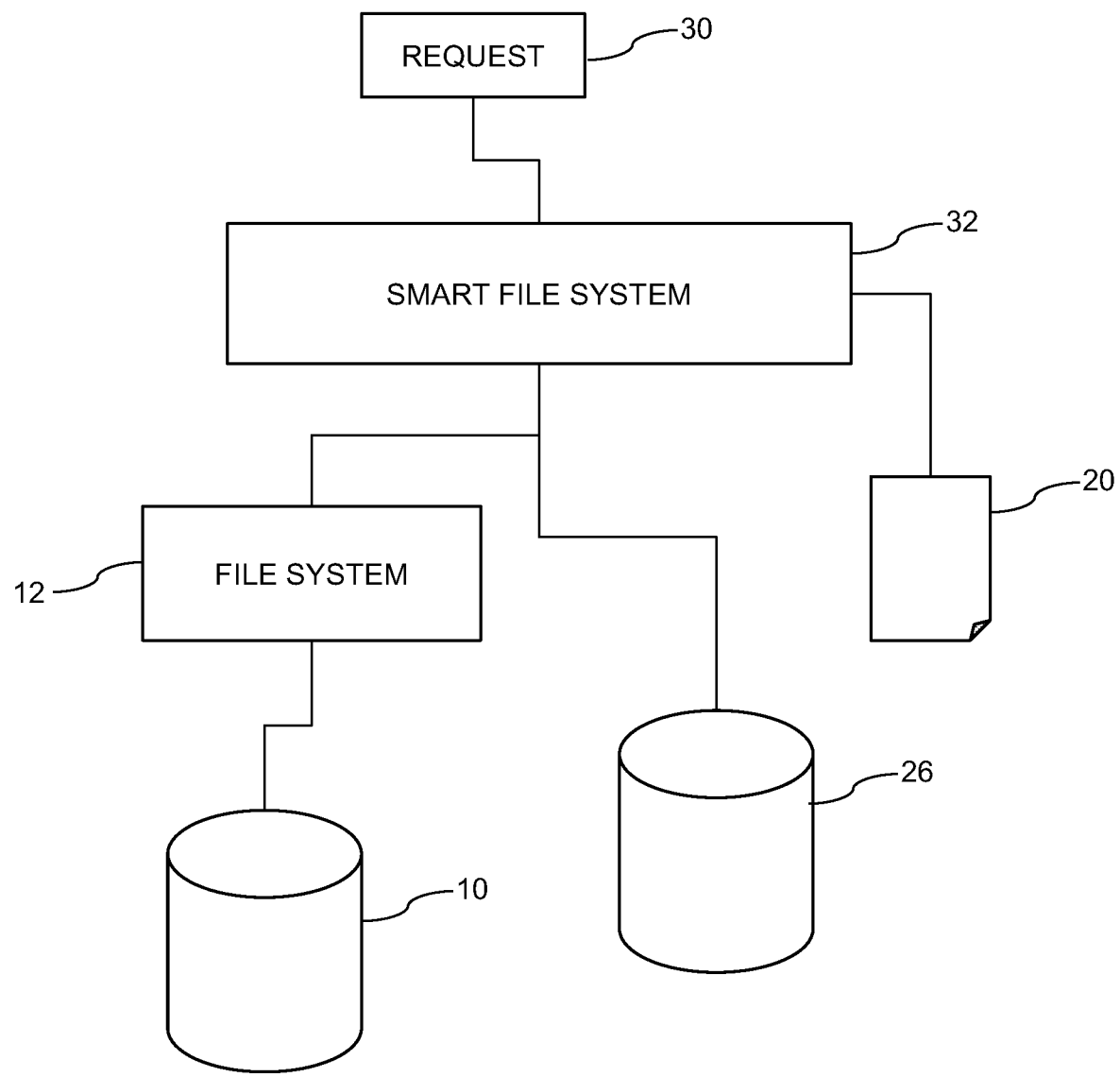
FIG. 7 is a schematic diagram of a second embodiment of the resource management system.
Figure 8:
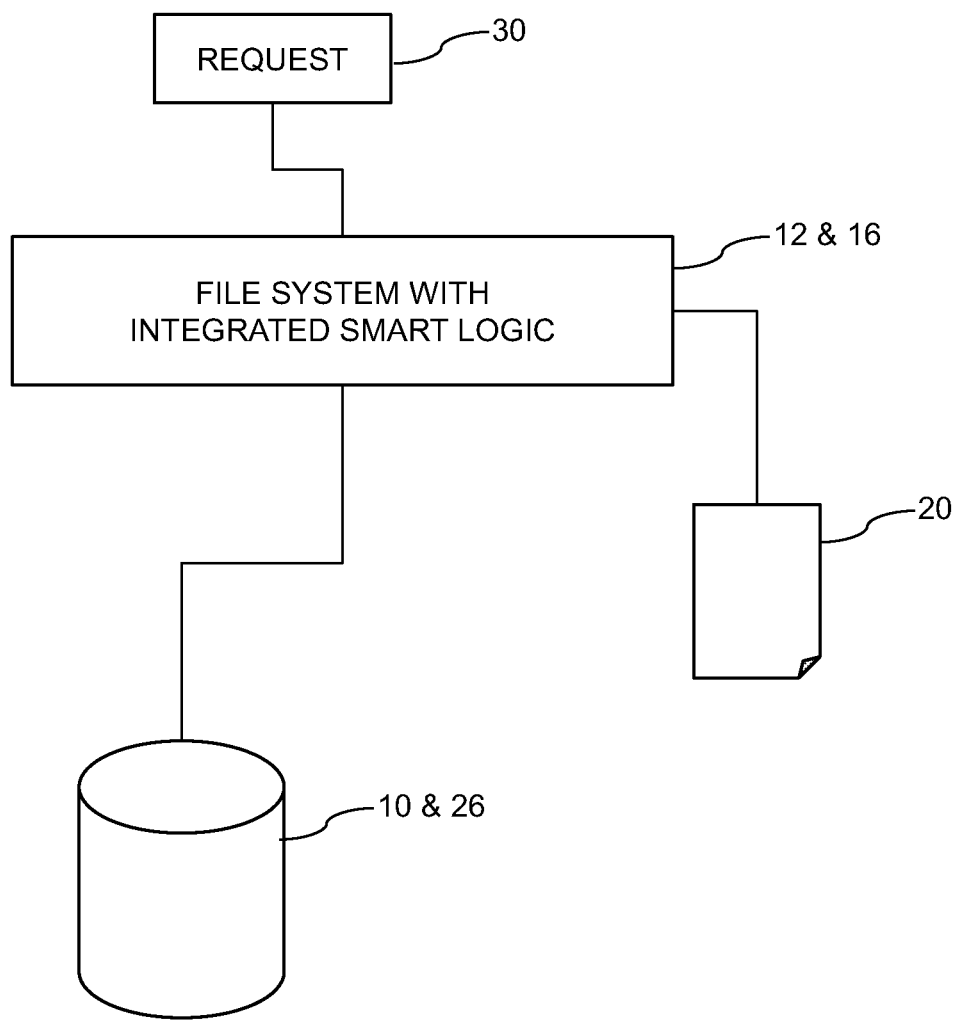
FIG. 8 is a schematic diagram of a third embodiment of the resource management system.

The resource management resource management system 16 has been described above as a resource management system 16 with separate components that is located on top of or next to an existing resource LCSP system 12. However, the same principles and method of operation can be applied with a more integrated approach, where the logic from the smart resource component lives directly in the resource LCSP system 12 itself and where the computing resources 10 and access patterns 26 and/or rules 20 are stored in the same storage. More detailed embodiments of the resource management resource management system 16 are shown in FIGS. 7 and 8. FIG. 7 shows the smart resource system as a separate component on top of a regular resource system, while FIG. 8 shows the more integrated approach.

FIG. 7 shows a second embodiment of the resource management resource management system 16. Requests 30 are received by a smart file system 32, which has access to the rules 20 and connects to a file LCSP system 12 that manages the normal user access to the computing resources 10. The smart file system 32 also has direct access to the usage patterns 26. FIG. 8 shows a third embodiment of the resource management resource management system 16, which is essentially integrated within the resource LCSP system 12, with access to the rules 20 and the usage patterns 26 are stored directly with the computing resources 10. The two different embodiments shown in FIGS. 7 and 8 still function according to the same process as that in FIG. 6.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 9:
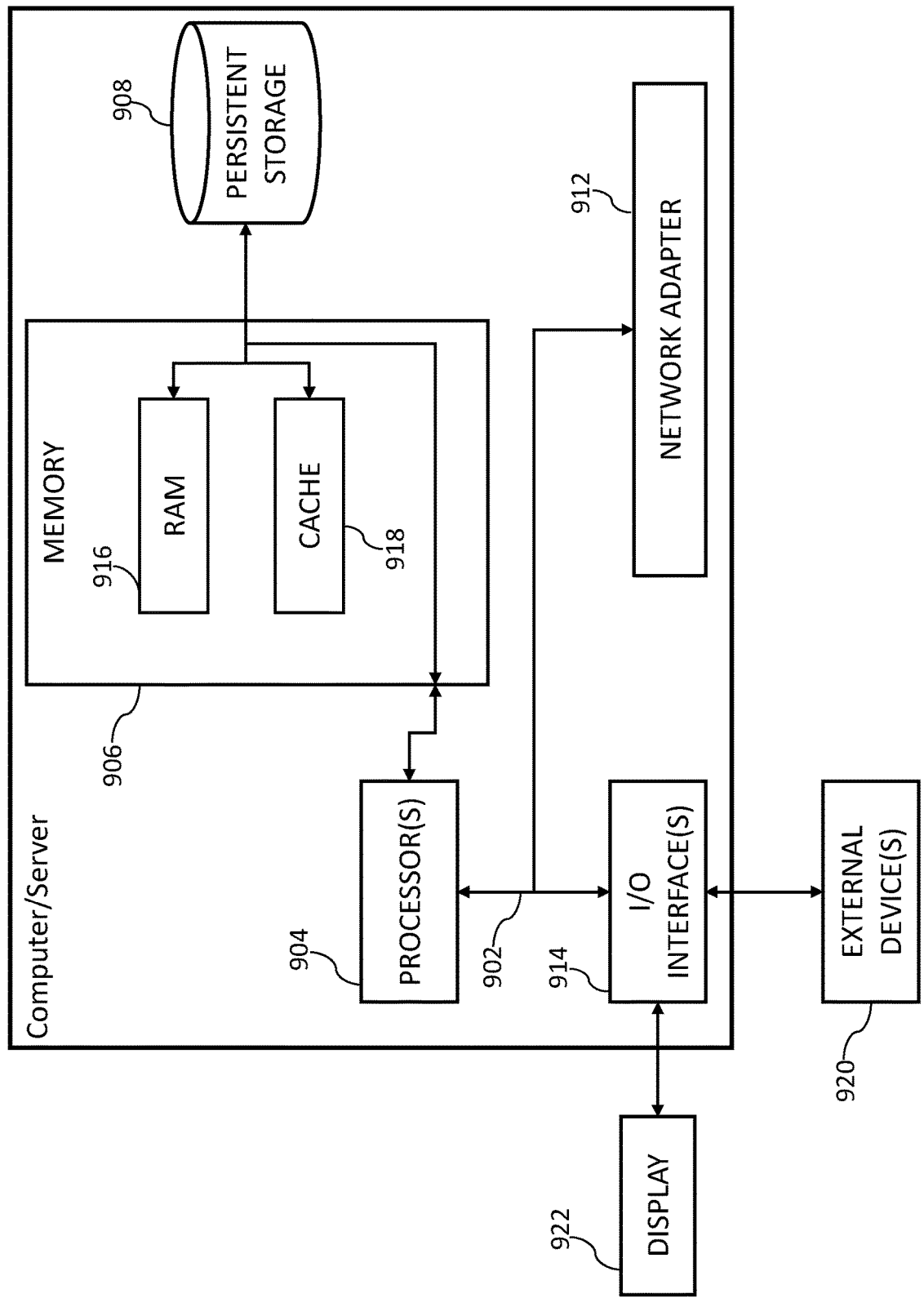
FIG. 9 is a block diagram depicting the hardware components of the system of FIG. 4, in accordance with an embodiment of the invention.

FIG. 9 depicts a block diagram of components of LCSP system 12, in accordance with an illustrative embodiment of the present invention. It should be appreciated that FIG. 9 provides only an illustration of one implementation and does not imply any limitations with regard to the environments in which different embodiments may be implemented. Many modifications to the depicted environment may be made.

LCSP system 12 includes communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The program resource management resource management system 16, in LCSP system 12, is stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The program resource management resource management system 16, in LCSP system 12, may be downloaded to persistent storage 908 through network adapter 912.

I/O interface(s) 914 allows for input and output of data with other devices that may be connected to LCSP system 12. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., program resource management resource management system 16, in LCSP system 12, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A computer implemented method for managing a set of computing resources, the method comprising:
   accessing a set of rules for the set of computing resources, wherein each rule comprises one or more conditions relating to use of a computing resource, one or more actions, and a usage pattern template, wherein the usage pattern template comprises at least one metric relating to access of the computing resource by one or more users;
   capturing information relating to use of the computing resource, wherein the information relating to use of the computing resource comprises a usage pattern of the computing resource within a system, wherein the usage pattern of the computing resource comprises at least one metric relating to access of the computing resource by one or more users, and wherein the usage pattern of the computing resource is maintained by the system prior to and post deletion of the computing resource;
   performing a scheduled access pattern comparison between the usage pattern template and the usage pattern;
   applying each rule of the set of rules that include a condition relating to use of the computing resource, when the computing resource is used;
   performing each action included in a specific rule of the applied each rule of the set of rules that include a condition relating to use of the computing resource when the condition relating to use of the computing resource is met;
   comparing a statistic of the usage pattern of the computing resource against a corresponding statistic of the usage pattern template; and
   sending a notification in response to the comparing resulting in a difference between the statistic of the usage pattern of the computing resource and the corresponding statistic of the usage pattern template exceeding a threshold amount.

2. The method of claim 1, wherein one or more rules of the set of rules comprise a condition relating to a current error rate of the computing resource referenced in the condition relating to use of the computing resource.

3. The method of claim 2, further comprising:
   determining that the computing resource referred to in a rule including the condition relating to a current error rate of the computing resource has been deleted; and
   restoring the computing resource.

4. The method of claim 1, further comprising:
   storing the captured information relating to the use of the computing resource with the computing resource.

5. The method of claim 1, wherein the capturing of information relating to the use of the computing resource comprises capturing data comprising the frequency of access of the computing resource over time.

6. The method of claim 1, wherein the usage pattern template and the usage pattern of the computing resource comprises statistics on at least one of: how frequently the computing resource is accessed; how frequently the computing resource is not found; how many users have access or had access to the computing resource; a total number of access requests for the computing resource; a total number of users of the computing resource; file size; backup frequency; a total number of changes to the computing resource; peak usage of the computing resource during certain times; and details on which user performs which type of operation on the computing resource.

7. A computer program product for managing a set of computing resources, the computer program product comprising:
one or more non-transitory computer-readable tangible storage devices and program instructions stored on at least one of the one or more computer-readable tangible storage devices, the program instructions executable by a computer, the program instructions comprising:
program instructions to access a set of rules for the set of computing resources, wherein each rule comprises one or more conditions relating to use of a computing resource, one or more actions, and a usage pattern template, wherein the usage pattern template comprises at least one metric relating to access of the computing resource by one or more users;
program instructions to capture information relating to use of the computing resource, wherein the information relating to use of the computing resource comprises a usage pattern of the computing resource within a system, wherein the usage pattern of the computing resource comprises at least one metric relating to access of the computing resource by one or more users, and wherein the usage pattern of the computing resource is maintained by the system prior to and post deletion of the computing resource;
program instructions to perform a scheduled access pattern comparison between the usage pattern template and the usage pattern;
program instructions to apply each rule of the set of rules that include a condition relating to use of the computing resource, when the computing resource is used;
program instructions to perform each action included in a specific rule of the applied each rule of the set of rules that include a condition relating to use of the computing resource when the condition relating to use of the computing resource is met;
program instructions to compare a statistic of the usage pattern of the computing resource against a corresponding statistic of the usage pattern template; and
program instructions to send a notification in response to the comparison resulting in a difference between the statistic of the usage pattern of the computing resource and the corresponding statistic of the usage pattern template exceeding a threshold amount.

8. The computer program product of claim 7, wherein one or more rules of the set of rules comprise a condition relating to a current error rate of the computing resource referenced in the condition relating to use of the computing resource.

9. The computer program product of claim 8, further comprising:
program instructions to determine that the computing resource referred to in a rule including the condition relating to a current error rate of the computing resource has been deleted; and
program instructions to restore the computing resource.

10. The computer program product of claim 7, further comprising:
program instructions to store the captured information relating to the use of the computing resource with the computing resource.

11. The computer program product of claim 7, wherein the capture of information relating to the use of the computing resources comprises program instructions to capture data comprising the frequency of access of the computing resource over time.

12. The computer program product of claim 7, wherein the usage pattern template and the usage pattern of the computing resource comprises statistics on at least one of: how frequently the computing resource is accessed; how frequently the computing resource is not found; how many users have access or had access to the computing resource; a total number of access requests for the computing resource; a total number of users of the computing resource; file size; backup frequency; a total number of changes to the computing resource; peak usage of the computing resource during certain times; and details on which user performs which type of operation on the computing resource.

13. A computer system for object data storage, the computer system comprising:
one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
program instructions to access a set of rules for the set of computing resources, wherein each rule comprises one or more conditions relating to use of a computing resource, one or more actions, and a usage pattern template, wherein the usage pattern template comprises at least one metric relating to access of the computing resource by one or more users;
program instructions to capture information relating to use of the computing resource, wherein the information relating to use of the computing resource comprises a usage pattern of the computing resource within a system, wherein the usage pattern of the computing resource comprises at least one metric relating to access of the computing resource by one or more users, and wherein the usage pattern of the computing resource is maintained by the system prior to and post deletion of the computing resource;
program instructions to perform a scheduled access pattern comparison between the usage pattern template and the usage pattern;
program instructions to apply each rule of the set of rules that include a condition relating to use of the computing resource, when the computing resource is used;
program instructions to perform each action included in a specific rule of the applied each rule of the set of rules that include a condition relating to use of the computing resource when the condition relating to use of the computing resource is met;
program instructions to compare a statistic of the usage pattern of the computing resource against a corresponding statistic of the usage pattern template; and
program instructions to send a notification in response to the comparison resulting in a difference between the statistic of the usage pattern of the computing resource and the corresponding statistic of the usage pattern template exceeding a threshold amount.

14. The computer system of claim 13, wherein one or more rules of the set of rules comprise a condition relating to a current error rate of the computing resource referenced in the condition relating to use of the computing resource.

15. The computer system of claim 14, further comprising:
program instructions to determine that the computing resource referred to in a rule including the condition relating to a current error rate of the computing resource has been deleted; and
program instructions to restore the computing resource.

16. The computer system of claim 13, further comprising:
program instructions to store the captured information relating to the use of the computing resource with the computing resource.

17. The computer system of claim 13, wherein the capture of information relating to the use of the computing resources comprises program instructions to capture data comprising the frequency of access of the computing resource over time.

18. The computer system of claim 13, wherein the usage pattern template and the usage pattern of the computing resource comprises statistics on at least one of: how frequently the computing resource is accessed; how frequently the computing resource is not found; how many users have access or had access to the computing resource; a total number of access requests for the computing resource; a total number of users of the computing resource; file size; backup frequency; a total number of changes to the computing resource; peak usage of the computing resource during certain times; and details on which user performs which type of operation on the computing resource.

* * * * *